(12) United States Patent
Orubor

(10) Patent No.: US 9,545,642 B2
(45) Date of Patent: Jan. 17, 2017

(54) CHEMICAL DISPENSER

(76) Inventor: Lawrence Orubor, Calgary (CA)

(*) Notice: Subject to any disclaimer, the term of this patent is extended or adjusted under 35 U.S.C. 154(b) by 788 days.

(21) Appl. No.: 13/276,699

(22) Filed: Oct. 19, 2011

(65) Prior Publication Data

US 2012/0097763 A1 Apr. 26, 2012

Related U.S. Application Data

(60) Provisional application No. 61/383,751, filed on Oct. 21, 2010.

(51) Int. Cl.
*B05B 7/26* (2006.01)
*B05B 7/30* (2006.01)
*A01C 23/04* (2006.01)

(52) U.S. Cl.
CPC .............. *B05B 7/30* (2013.01); *A01C 23/042* (2013.01)

(58) Field of Classification Search
USPC ............... 239/200, 201, 203–206, 273, 282, 283,239/303–305, 308–310, 317, 318, 407; 137/268, 564.5
See application file for complete search history.

(56) References Cited

U.S. PATENT DOCUMENTS

| | | | |
|---|---|---|---|
| 3,351,290 A * | 11/1967 | Baldwin | 239/317 |
| 3,680,504 A | 8/1972 | Seebald | |
| 3,968,932 A * | 7/1976 | Kimmell | 137/268 |
| 4,957,131 A | 9/1990 | Robinson | |
| 5,100,060 A | 3/1992 | Haferkorn | |
| 5,119,992 A | 6/1992 | Grime | |
| 5,213,265 A | 5/1993 | Englhard et al. | |
| 5,695,125 A | 12/1997 | Kumar | |
| 6,077,362 A | 6/2000 | Reed | |
| 6,173,732 B1 * | 1/2001 | Davis et al. | 239/310 |
| 6,345,773 B1 | 2/2002 | Shanklin et al. | |
| 7,703,170 B2 | 4/2010 | Orubor | |
| 2007/0138320 A1 | 6/2007 | Timmes et al. | |
| 2008/0030032 A1 | 2/2008 | Gill | |
| 2008/0093486 A1 | 4/2008 | Orubor | |
| 2009/0070953 A1 | 3/2009 | Orubor | |

FOREIGN PATENT DOCUMENTS

| | | |
|---|---|---|
| CA | 2689384 | 12/2007 |
| CA | 2628557 | 10/2008 |
| FR | 2630141 | 10/1989 |
| WO | 2004/059090 | 7/2004 |
| WO | 2004/107947 | 12/2004 |

* cited by examiner

*Primary Examiner* — Steven J Ganey
(74) *Attorney, Agent, or Firm* — Maxey Law Offices, PLLC.; Stephen Lewellyn

(57) ABSTRACT

A chemical dispensing apparatus to deliver a treatment solution includes a housing configured to be mounted to a wall surface and main fluid passage fitted with an inlet hose coupling at one end and an outlet hose coupling at an opposite end. A control valve is disposed across the main fluid passage at an upstream location and a flap valve is disposed across the main fluid passage at a downstream location of the control valve. A chemical mixing fluid passage is connected at one end to the first control valve and connected at an opposite end to the flap valve. A siphon tube connects a fluid accumulator and the chemical mixing fluid passage such that a flow of fluid through the chemical mixing passage results in liquid chemical contained in the fluid accumulator being drawn through the siphon tube into the flow of fluid through chemical mixing fluid passage.

9 Claims, 20 Drawing Sheets

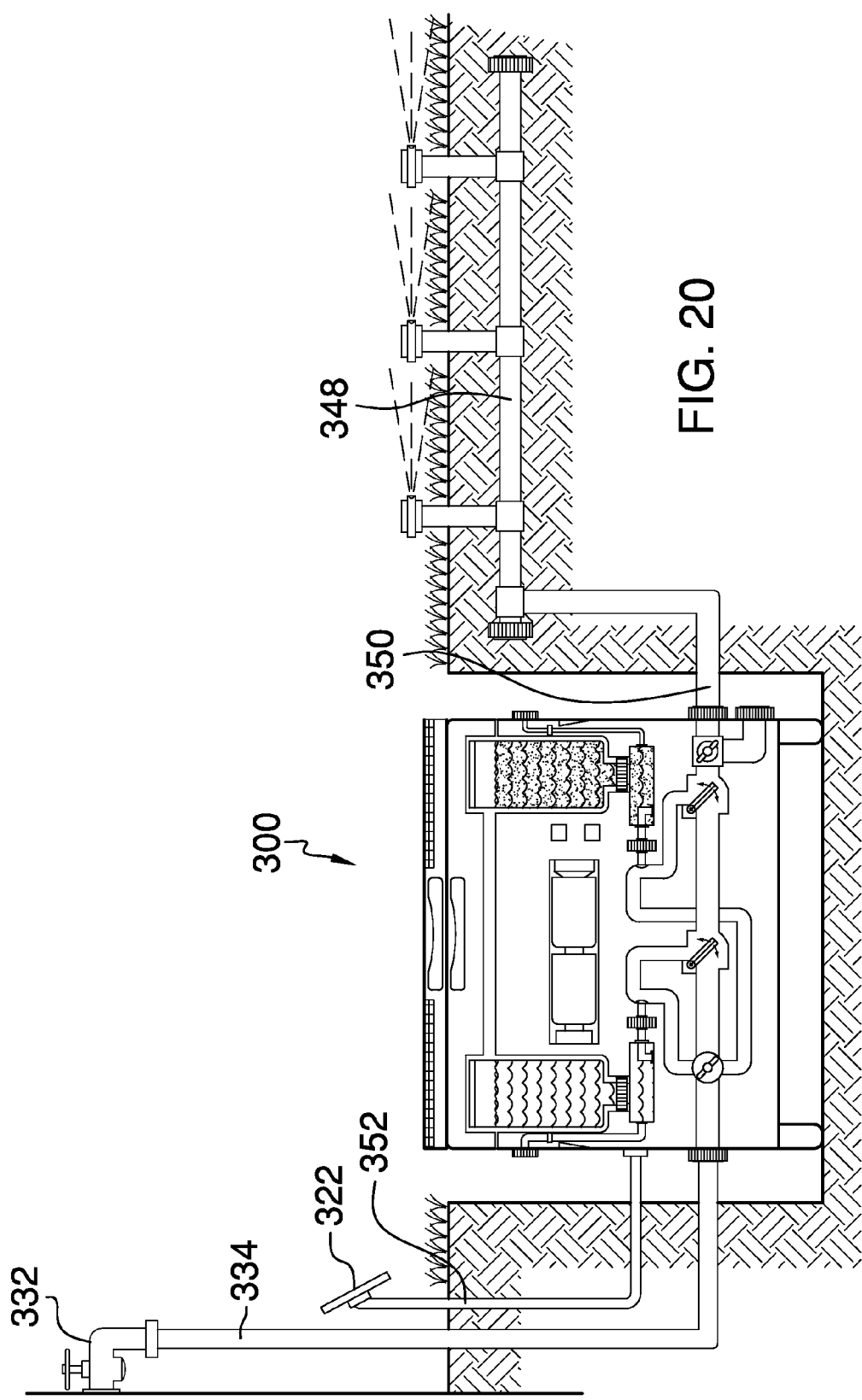

CHEMICAL DISPENSER

CROSS-REFERENCE TO RELATED APPLICATIONS

This application claims the benefit of U.S. Provisional Application No. 61/383,751, filed Oct. 21, 2010, the entirety of which is incorporated herein by reference.

FIELD OF THE INVENTION

The present invention relates generally to a yard or garden accessory enabling the automatic addition of a lawn treatment material, such as fertilizer, herbicide or insecticide, to the water being sprinkled on yard or garden.

BACKGROUND OF THE INVENTION

The proper treatment and care of yards and gardens is highly desirable to prevent destruction from insects and deterioration from malnutrition. The mixture and application of treatment solutions, however, is a time consuming procedure that requires close attention to chemical-water ratios and their distribution. Since proper care equates to scheduled maintenance, many lawns and gardens become neglected, resulting in unnecessary refurbishing costs. Moreover, lawns, gardens, and vegetation still fall victim to improper maintenance, despite consistent care when poorly balanced solutions are administered.

SUMMARY OF THE INVENTION

The chemical dispenser of this invention provides an apparatus for incorporation into a water supply system a way to deliver lawn treatment chemicals such as fertilizer, herbicide or insecticide to lawns, yards and other botanical and life systems by the controlled application of the chemicals in amounts and periods.

In general, in one aspect, a chemical dispensing apparatus for use in delivery of a treatment solution to a lawn is provided. The apparatus includes a housing configured to be mounted to a wall surface and main fluid passage fitted with an inlet hose coupling at one end thereof and fitted an outlet hose coupling at an opposite end thereof. The inlet hose coupling permitting connection of the main fluid passage to a source of pressurized water. The outlet hose coupling permitting connection of the main fluid passage to a fluid distribution system. A first control valve is disposed across the main fluid passage at an upstream location of the main fluid passage. A flap valve is disposed across the main fluid passage at a downstream location of the main fluid passage. A chemical mixing fluid passage is connected at one end to the first control valve and connected at an opposite end to the flap valve. The apparatus further includes a fluid accumulator for containing a liquid chemical. A siphon tube connects the fluid accumulator and the chemical mixing fluid passage such that a flow of fluid through the chemical mixing passage results in a quantity of liquid chemical contained in the fluid accumulator being drawn through the siphon tube and into the flow of fluid through chemical mixing fluid passage.

In general, in another aspect, the apparatus further includes a second control valve disposed across the main fluid passage at a downstream location from the flap valve and an auxiliary outlet passage connected at one end to the second control valve and fitted at an opposite end with an auxiliary hose coupling.

In general, in another aspect, the apparatus further includes an auxiliary chemical concentrate fluid coupling configured to permit fluidic connection of the fluid accumulator with a secondary supply of chemical concentrate liquid.

In general, in yet another aspect, the apparatus further includes a power source, a hand held spray nozzle connected to one of the outlet hose coupling and the auxiliary hose coupling by a fluid hose, a control switch carried by the hand held spray nozzle and an electrical communication cable operably connecting the control switch, the power source and the electric pump such that operation of the control switch provides electrical power from the power source to the electric pump.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 20 is a diagrammatic view of an alternative embodiment of a chemical dispenser.

DETAILED DESCRIPTION OF THE INVENTION

As a preliminary matter, it should be noted that in this document directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

In this description, references to "one embodiment" or "an embodiment" mean that the featuring being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein.

Figure 1:
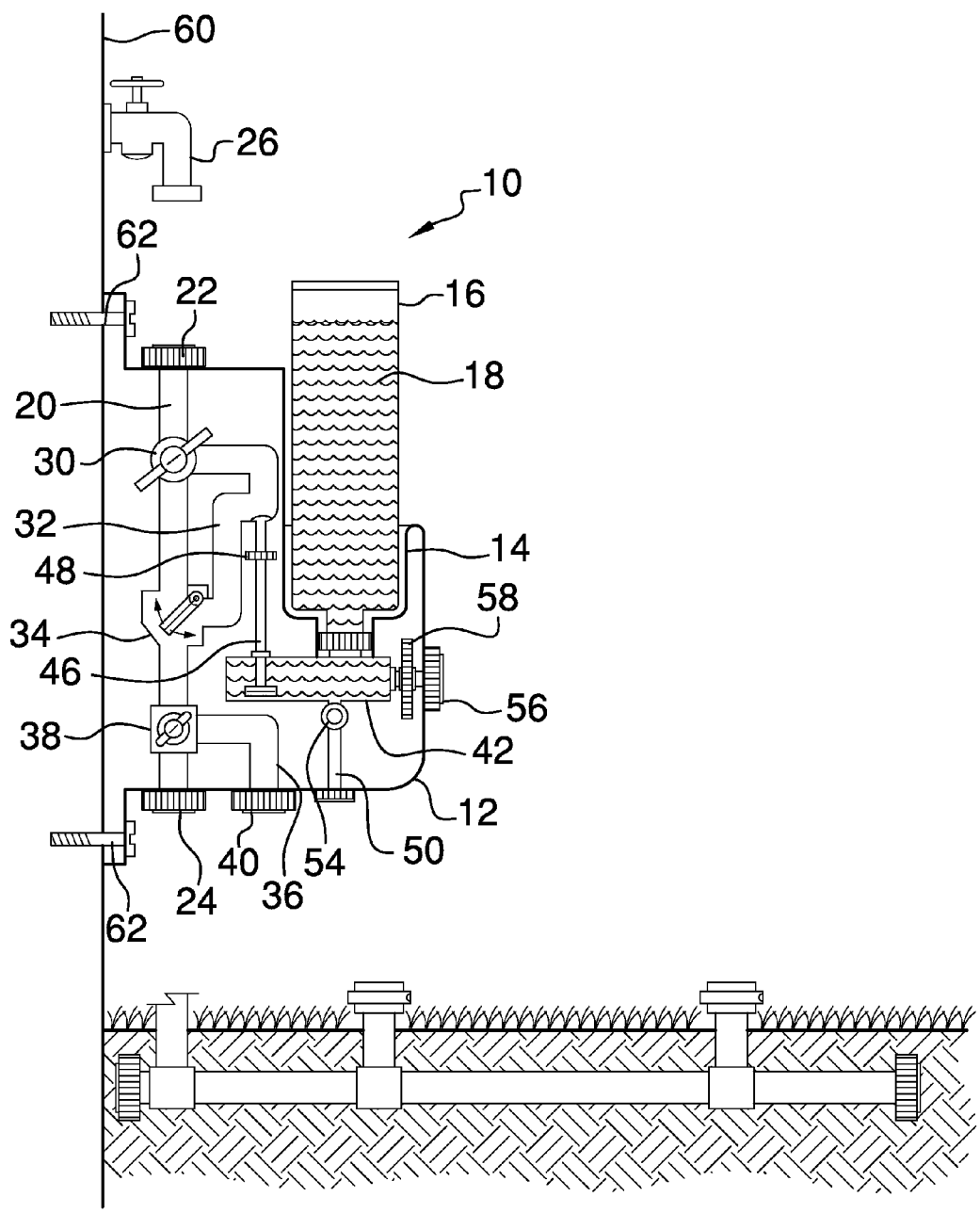
FIG. 1 is a diagrammatic view of an embodiment of a chemical dispenser constructed in accordance with the principles of the present invention.
Figure 2:
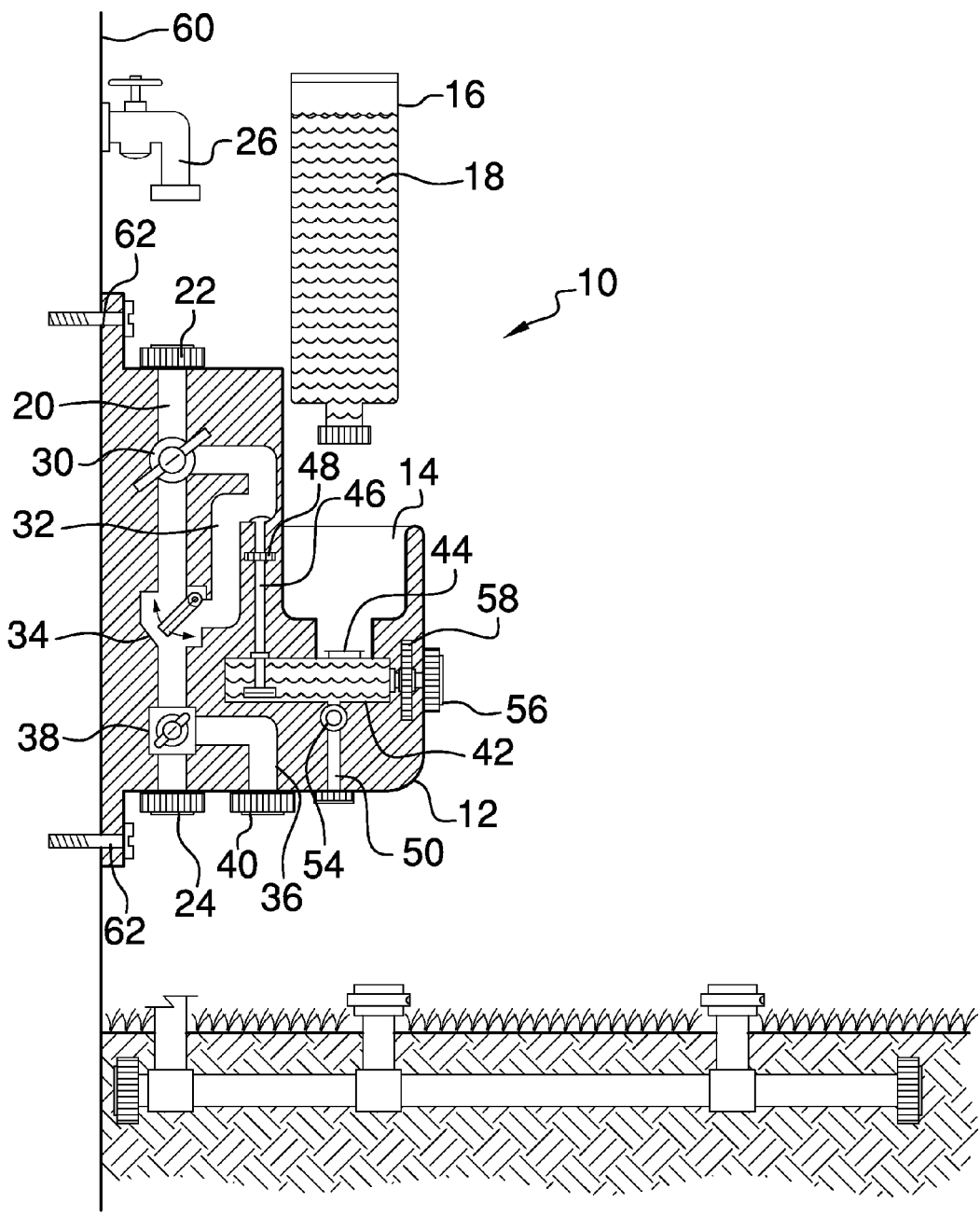
FIG. 2 is a diagrammatic view of the dispenser of FIG. 1 partially exploded.

Referring to the figures, FIG. 1 and FIG. 2 diagrammatically illustrate one embodiment of a chemical dispenser 10 having a housing 12 including a cradle 14 adapted to removably receive a container 16 holding a quantity of a chemical concentrate solution 18 to be admix with fresh water and dispensed by the chemical dispenser. In FIG. 2, the container 16 is illustrated removed from the cradle 14. In embodiments, the chemical concentrate solution 18 may be a herbicide, insecticide, fertilizer and the like. The chemical dispenser 10 is particularly well suite for the mixing, dispensing, spraying and/or distribution of the mixed chemical concentrate solution across lawns and gardens. In embodiments, as will be become apparent, embodiments of the chemical dispenser of the invention may also be used for other purposes such as washing vehicles, windows, sidings, etc.

Figure 3:
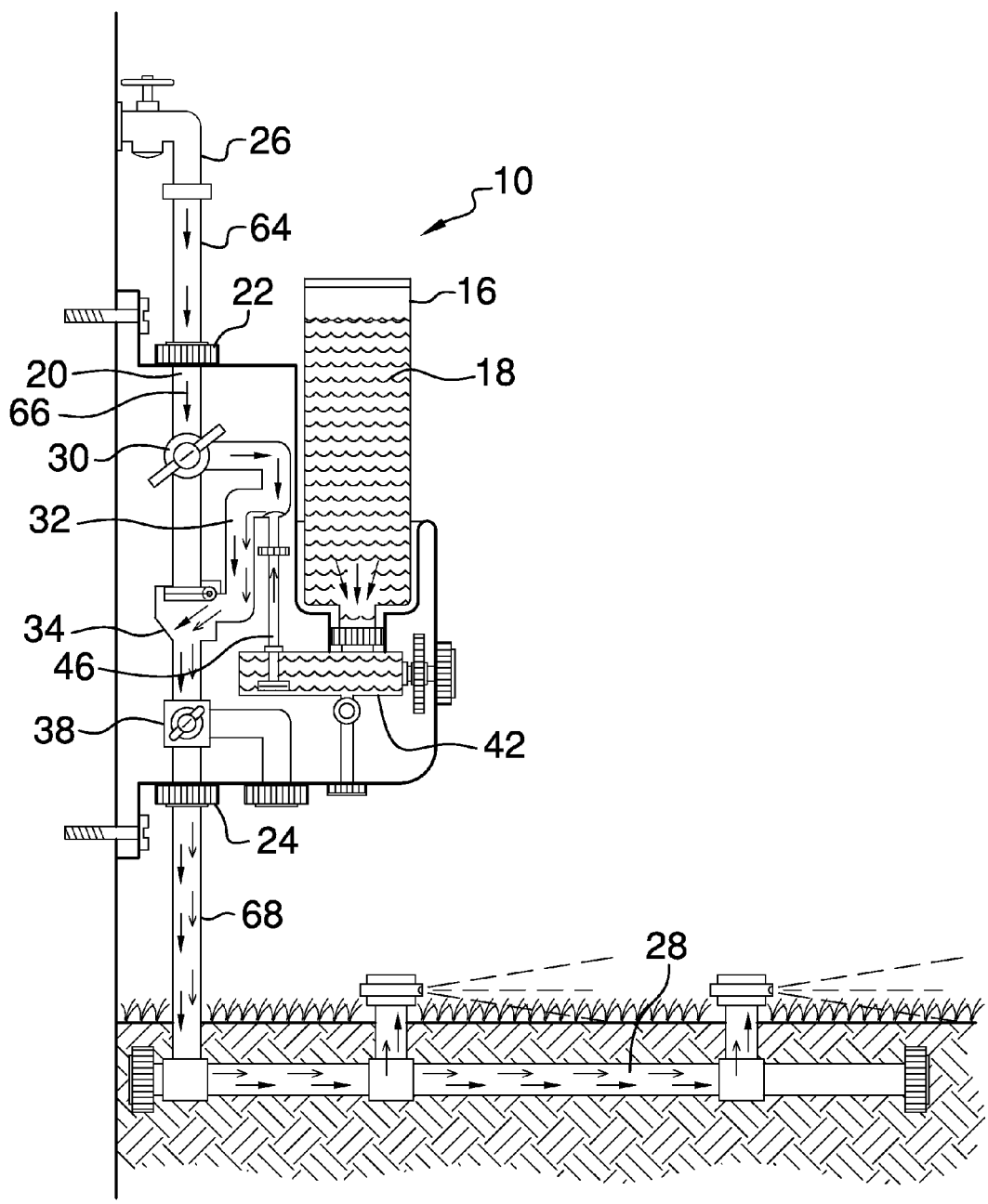
FIG. 3 is a diagrammatic view of the dispenser of FIG. 1 in a mode of operation.

Housing 12 is configured with several fluid flow passages and various valves and distributors for operating the chemical dispenser 10 in various modes of operation. Housing 12 generally includes a main fluid passage 20 vertically extending therethrough and fitted with an inlet hose coupling 22 at one end and fitted with a first outlet hose coupling 24 at the opposite end. Inlet hose coupling 22 permits connecting the main fluid passage 20 to a source of pressurized fresh water, such as water faucet 26 by a flexible or rigid hose, as seen in FIG. 3. Hose coupling 24 permits connecting the main fluid passage 20 to fluid spraying device or fluid distribution system, such as an under ground water sprinkler system 28 by a flexible or rigid hose, as seen in FIG. 3.

Maintaining reference to FIG. 1 and FIG. 2, a chemical mixing fluid passage 32 is fluidically connected at one end to the main fluid passage 20 at an upstream location by a first control valve 30 and is fluidically connected at an opposite end to the main fluid passage at a downstream location by a flap valve 34. First control valve 30 is configured and operable to selectively connect the chemical mixing fluid passage 32 to the main fluid passage 20 such that at least a portion of the fresh supply water flowing through the main fluid passage is directed through the chemical mixing fluid passage. An auxiliary outlet passage 36 is fluidically connected at one end to the main fluid passage 20 at a downstream location of flap valve 34 by a second control valve 38, and is fitted at an opposite end with an auxiliary hose coupling 40. The second control valve 38 is configured and operable to selectively connect the auxiliary outlet passage 36 to the main fluid passage 20 such that at least a portion of the fluid flowing through the main fluid passage is directed through the auxiliary outlet passage.

Housing 12 further includes a fluid accumulator 42 to which container 16 is fluidically connected when received by cradle 14 such that the chemical concentrate solution 18 within the container is dispensed into the fluid accumulator. A check valve 44 may be provided and configured to fluidically connect the container 16 and the fluid accumulator 42 in a fluid sealing connection. The container 16 may be fitted with a membrane seal (not shown) and the cradle 14 may be fitted with a puncture conduit (not shown) to pierce through the membrane seal as the container is inserted into the cradle 14.

A siphon tube 46 extends between the fluid accumulator 42 and the chemical mixing fluid passage 32 and is configured such that when water flows through the chemical mixing fluid passage 32 a suction is caused in the siphon tube. The suction in the siphon tube 46 causes chemical concentrate solution 18 within the fluid accumulator 42 to be drawn into the chemical mixing fluid passage 32 where the chemical concentrate solution 18 is admixed with the flow of water. A dosage control valve or proportioning valve 48 may be positioned across the siphon tube 46 and configured to selectively control the flow of chemical concentrate solution 18 through the siphon tube, and thus adjust the concentrate of the chemical solution dispensed from the dispenser 10.

Still maintaining reference to FIG. 1 and FIG. 2, a drain passage 50 may be connected at one end to the fluid accumulator 42 and terminate at a second drain outlet 52. A drain valve 54 is positioned across the drain passage 50 and is operable to seal or open the drain passage to permit draining of chemical concentrate solution 18 within the fluid accumulator 42.

The housing 12 may further include an auxiliary chemical concentrate solution coupling 56 to permit connecting the fluid accumulator 42 with a secondary supply of chemical concentrate, as will be shown and described in further detail below. A control valve 58 may be positioned across coupling 46 and configured to selectively control the flow of chemical concentrate solution 18 from a secondary supply into the fluid accumulator 42.

As can further be seen in FIG. 1 and FIG. 2, housing 12 is configured to be mounted to a wall surface 60 by appropriate fasteners 62. Preferably, housing 12 is mounted to the wall surface 60 approximate a water faucet 26 to permit easy coupling of the dispenser 10 with the water faucet.

FIG. 3 diagrammatically illustrates the dispenser 10 in a first mode of operation. Here, fluid hose 64 is connected to the faucet 26 and the inlet hose coupling 22 thereby providing a flow of fresh water 66 into the main fluid passage 20. Control valve 30 is operated to fluidically connect the main fluid passage 20 and the chemical mixing fluid passage 32 to divert the flow of fresh water 66 from the main fluid passage through the chemical mixing fluid passage. As the flow of fresh water 66 passes across the siphon tube 46 chemical concentrate solution 18 is drawn from the fluid accumulator 42 and into the flow of fresh water where it is admixed therein forming a dilute chemical solution. Chemical concentrate solution 18 within container 16 flows into and refills the fluid accumulator 42. As the dilute chemical solution flows across flap valve 34 the flap valve is operated to seal the main fluid passage 20 preventing a backflow of fluid therethrough and to direct the dilute chemical solution towards valve 38. Here valve 38 is operated to fluidically connect the main fluid passage 20 to the first outlet hose coupling 24. A hose 68 connects the first outlet hose coupling 24 to an underground sprinkler system 28 where the dilute chemical solution is directed through the various conduits of the underground sprinkler system and dispensed through the various sprinkler heads of the underground sprinkler system.

Figure 4:
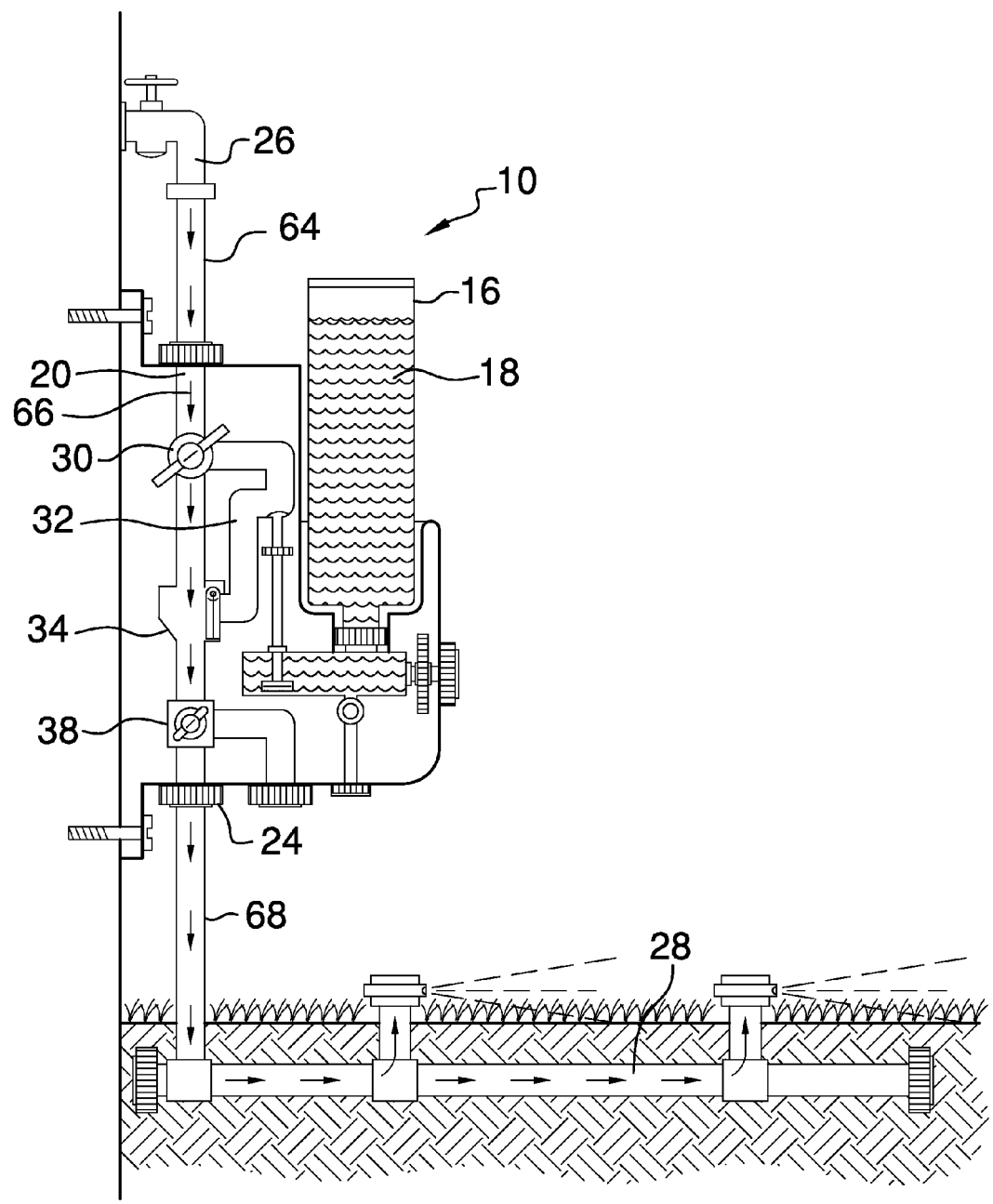
FIG. 4 is a diagrammatic view of the dispenser of FIG. 1 in a second mode of operation.

FIG. 4 diagrammatically illustrates the dispenser 10 in a second mode of operation. Here, control valve 30 is operated to disconnect the main fluid passage 20 from the chemical mixing fluid passage 32 such that the flow of fresh water 66 bypasses the chemical mixing fluid passage. The flow of fresh water 66 operates flap valve 34 to seal the downstream end of the chemical mixing fluid passage 32 from the main fluid passage 20. Valve 38 is operated to fluidically connect the main fluid passage 20 to the first outlet hose coupling 24, where the fresh water is directed into the connected underground sprinkler system 28 and dispensed.

Figure 5:
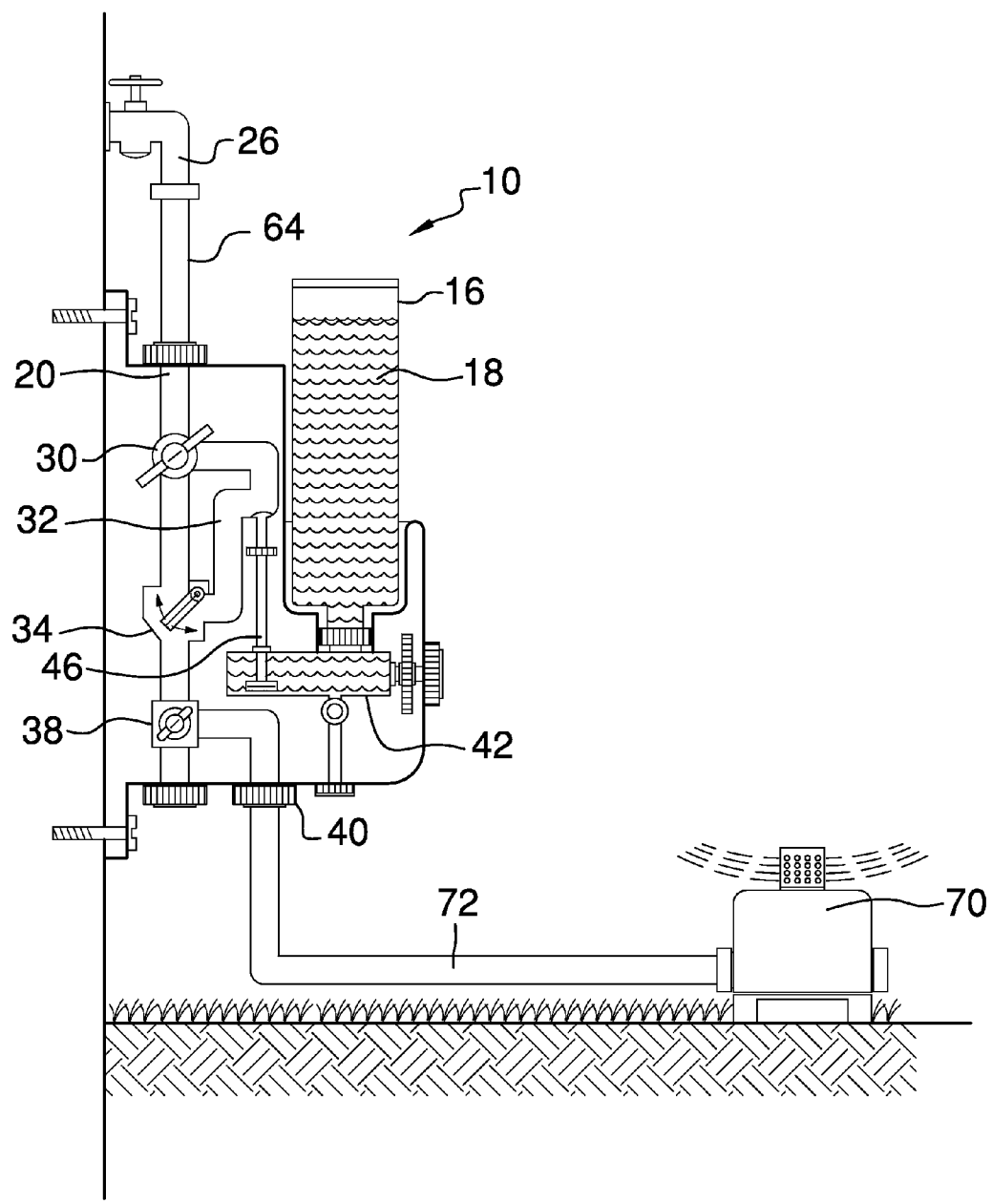
FIG. 5 is a diagrammatic view of the dispenser of FIG. 1 connected to and having an above ground sprinkler.

FIG. 5 diagrammatically illustrates the dispenser 10 having an above ground sprinkler 70 connected to the auxiliary hose coupling 40 by hose 72. In this configuration, valve 38 may be operated to dispense water or chemical solution through hose coupling 40 to be dispensed by the above ground sprinkler 70.

Figure 6:
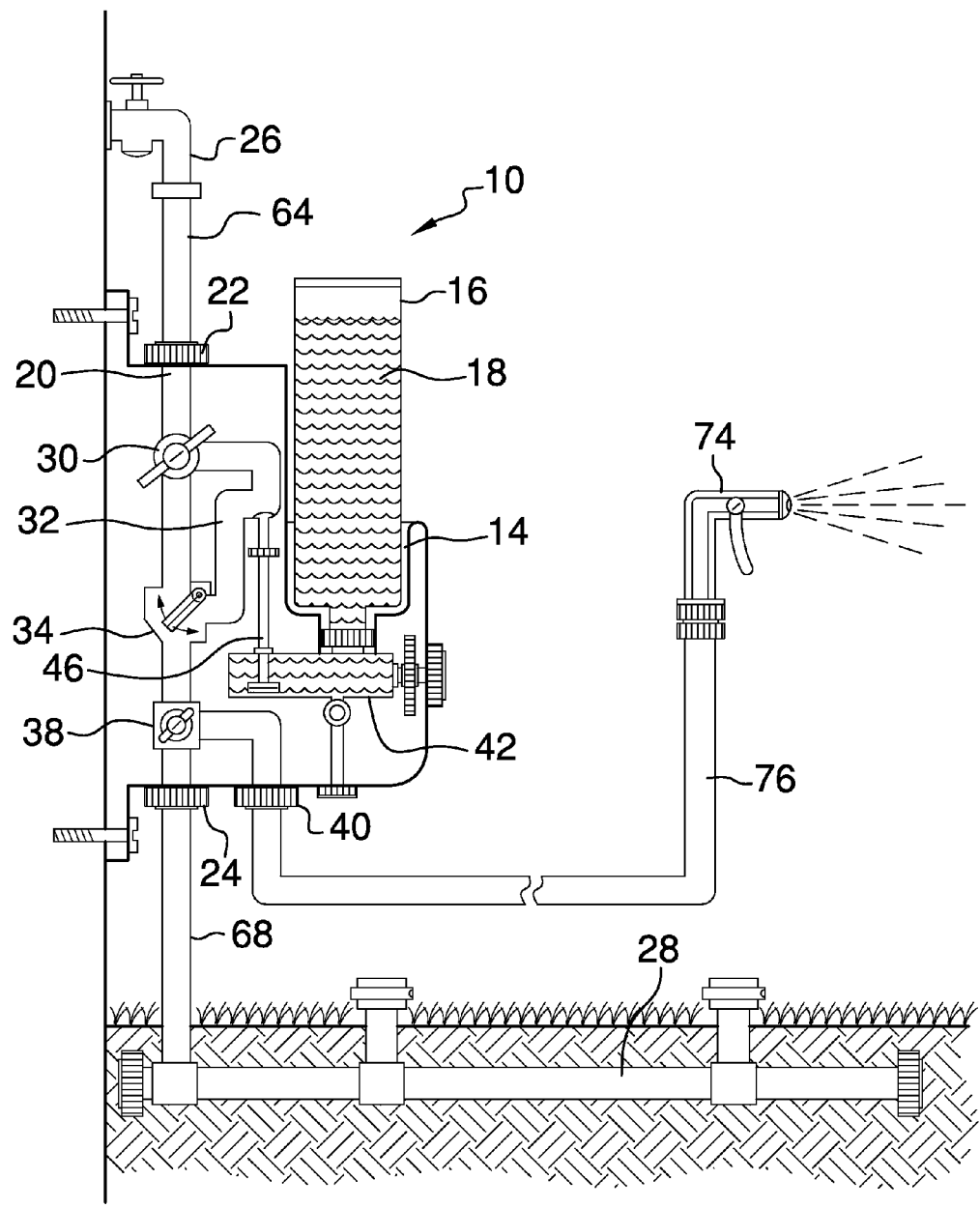
FIG. 6 is a diagrammatic view of the dispenser of FIG. 1 connected to and having a handheld spray nozzle.

FIG. 6 diagrammatically illustrates the dispenser 10 having a handheld spray nozzle 74 connected to the auxiliary hose coupling 40 by hose 76. In this configuration, valve 38 may be operated to dispense water or chemical solution through hose coupling 40 to be dispensed by the handheld spray nozzle 74.

Figure 7:
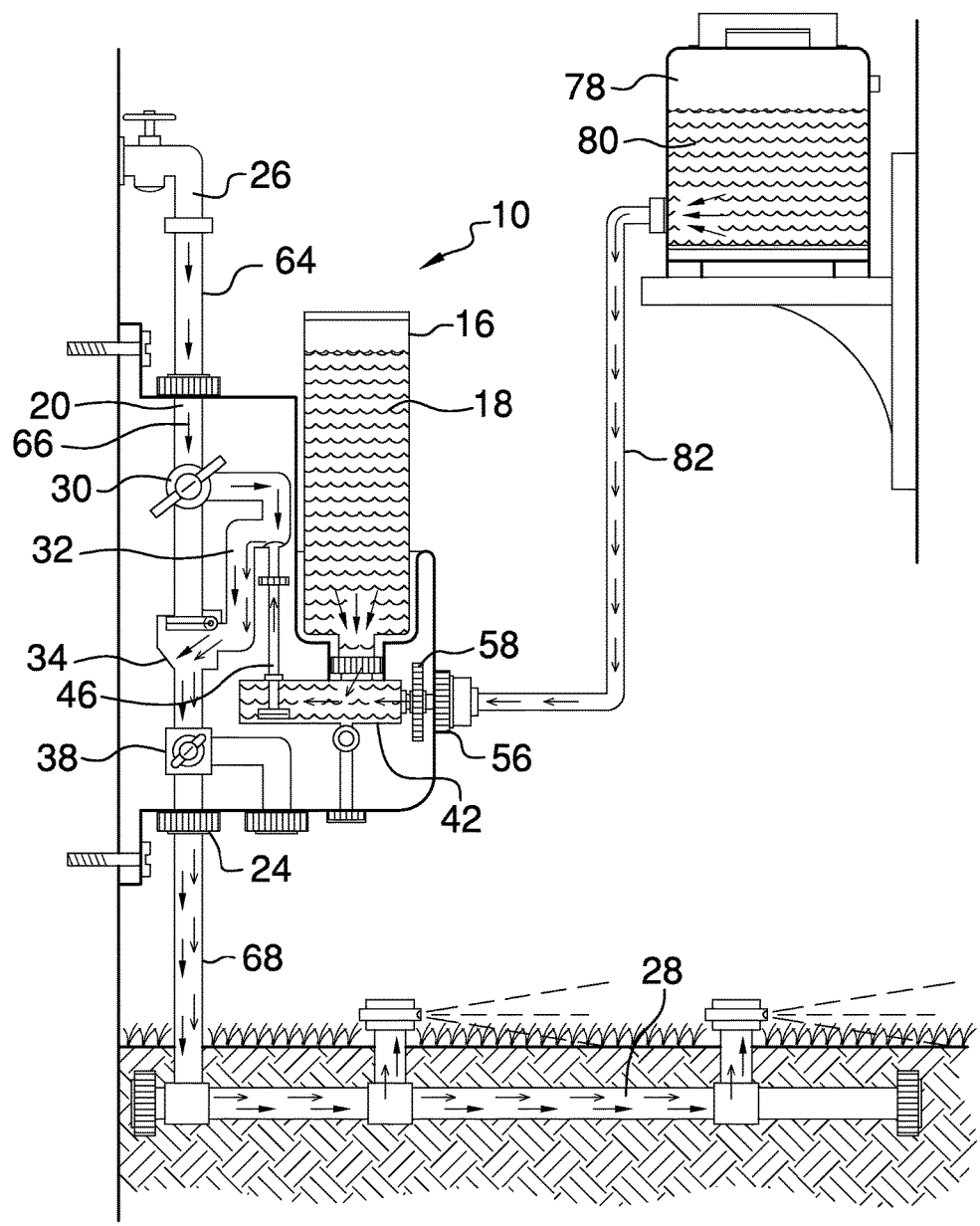
FIG. 7 is a diagrammatic view of the dispenser of FIG. 1 connected to and having a secondary supply of chemical concentrate solution.

FIG. 7 diagrammatically illustrates the dispenser 10 having an auxiliary container 78 containing a quantity of a secondary supply of chemical concentrate solution 80. Container 78 is fluidically connected to the auxiliary chemical concentrate solution coupling 56 by conduit 82. Here, container 78 must be positioned at an elevation above the fluid accumulator 42 to permit the gravity feeding of the chemical concentrate solution 80 into the fluid accumulator. Valve 58 can be operated to selectively control the flow of the chemical concentrate solution 80 into the fluid accumulator 42.

Figure 8:
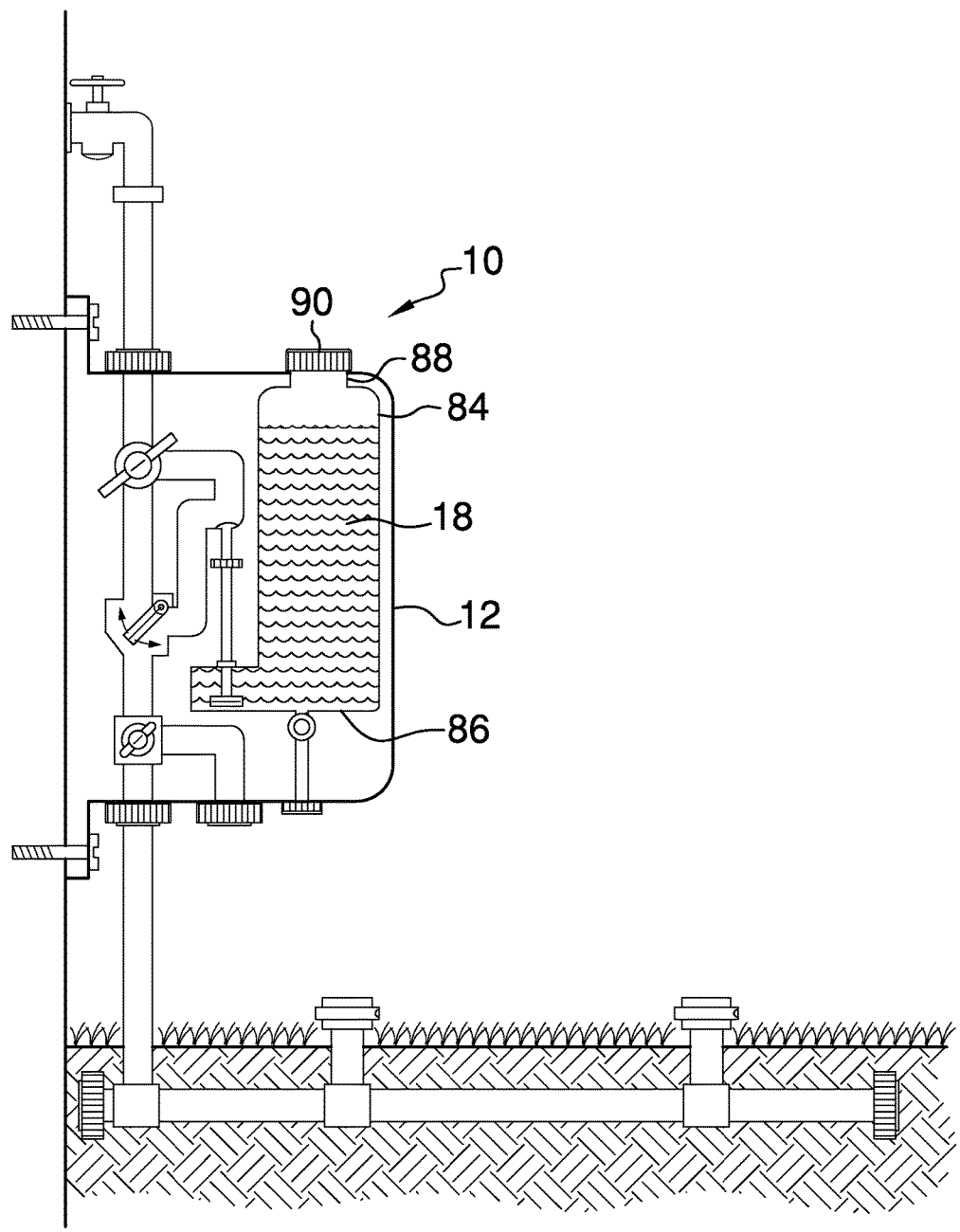
FIG. 8 is a diagrammatic view of an alternative embodiment of the dispenser of FIG. 1.

FIG. 8 diagrammatically illustrates an embodiment of the dispenser 10 having an integrated chemical solution concentrate container or receptacle 84 having an integrated fluid accumulator 86 as an alternative to the removable container 16 and fluid accumulator 42. Receptacle 84 includes an opening 88 to permit filling the receptacle 84 with chemical concentrate solution 18. A lid 90 is removably secured to housing 12 to seal opening 88. While not illustrated, this embodiment could also include the auxiliary chemical concentrate solution coupling 56 and valve 58 arrangement discussed above.

Figure 9:
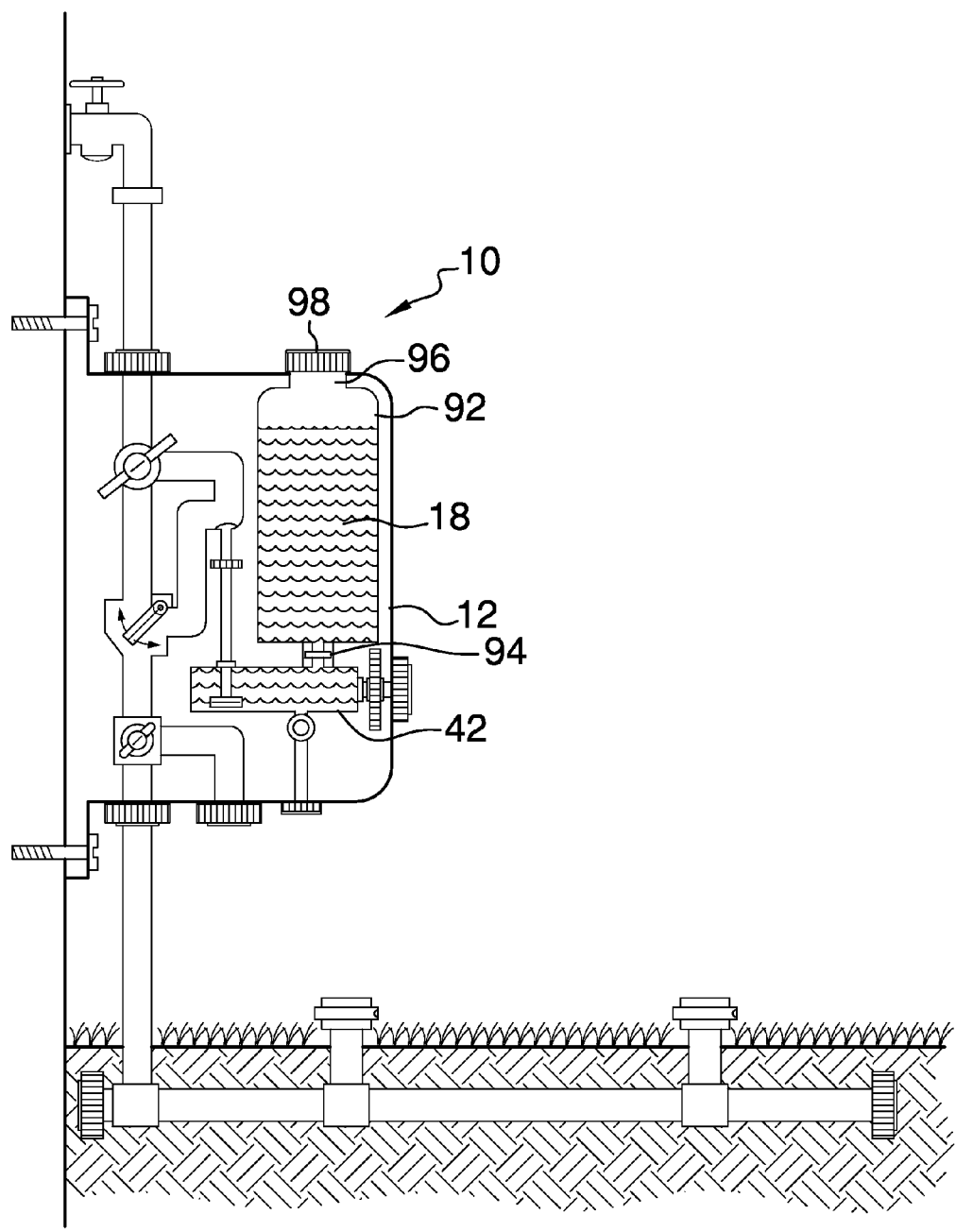
FIG. 9 is a diagrammatic view of an alternative embodiment of the dispenser of FIG. 1.

FIG. 9 diagrammatically illustrates an embodiment of the dispenser 10 having an integrated chemical solution container or receptacle 92. A regulator valve 94 fluidically connecting receptacle 92 and the fluid accumulator 42. Receptacle 92 includes an opening 96 to permit filling the receptacle 92 with chemical concentrate solution 18. A lid 98 is removably secured to housing 12 to seal opening 96.

Figure 10:
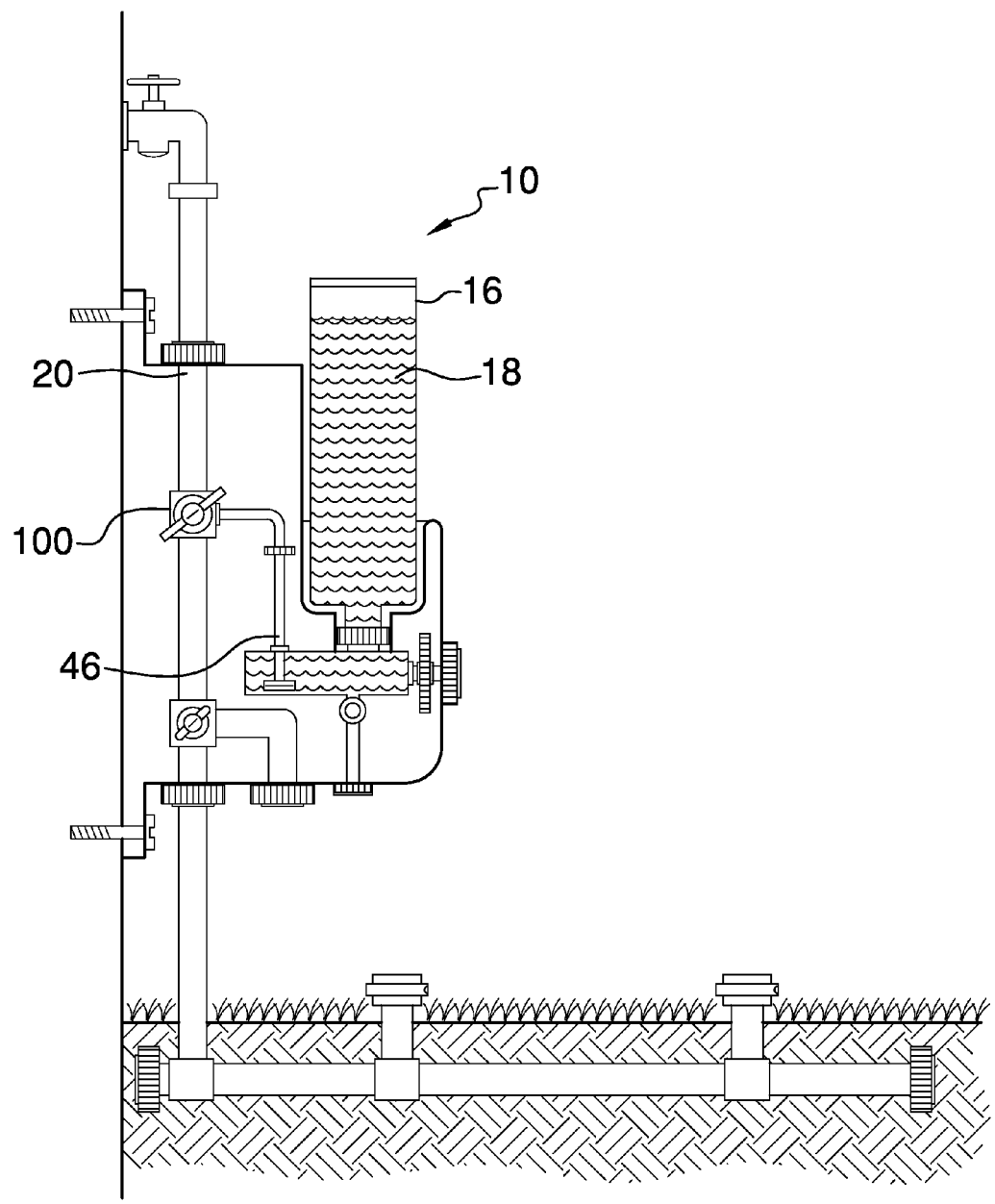
FIG. 10 is a diagrammatic view of an alternative embodiment of the dispenser of FIG. 1.

FIG. 10 diagrammatically illustrates an embodiment of the dispenser 10 having the siphon tube 46 connected to valve 100 disposed across the main fluid passage 20. This configuration is alternative to including the chemical mixing fluid passage 32 and flap valve 34.

Figure 11:
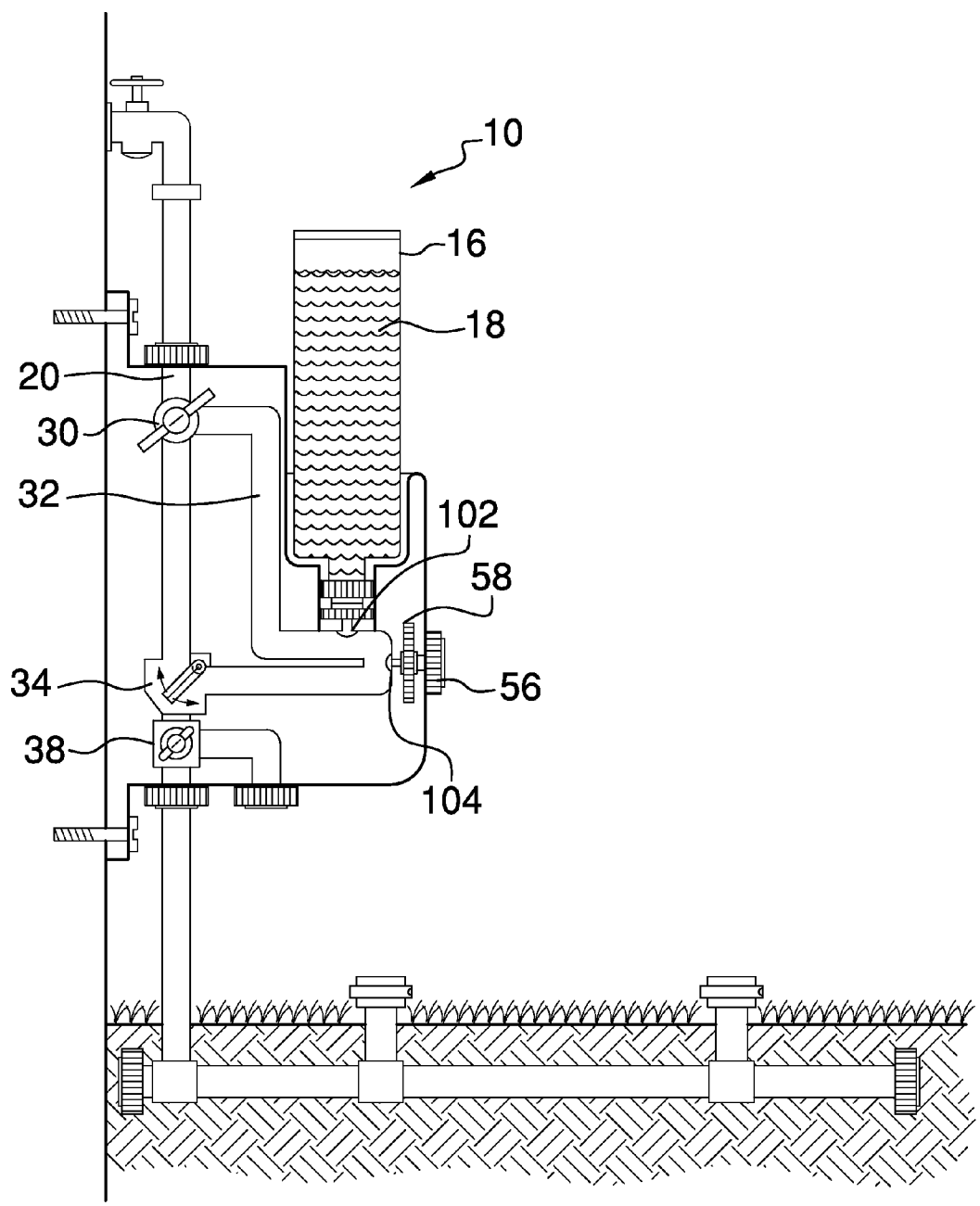
FIG. 11 is a diagrammatic view of an alternative embodiment of the dispenser of FIG. 1.

FIG. 11 diagrammatically illustrates an embodiment of the dispenser 10 having a siphon orifice 102 fluidically connecting the container 16 with the chemical mixing fluid passage 32 and a siphon orifice 104 fluidically connecting the auxiliary chemical concentrate solution coupling 56 and valve 58 to the chemical mixing fluid passage. This configuration is alternative to including the siphon tube 46 and the accumulator 42.

Figure 12:
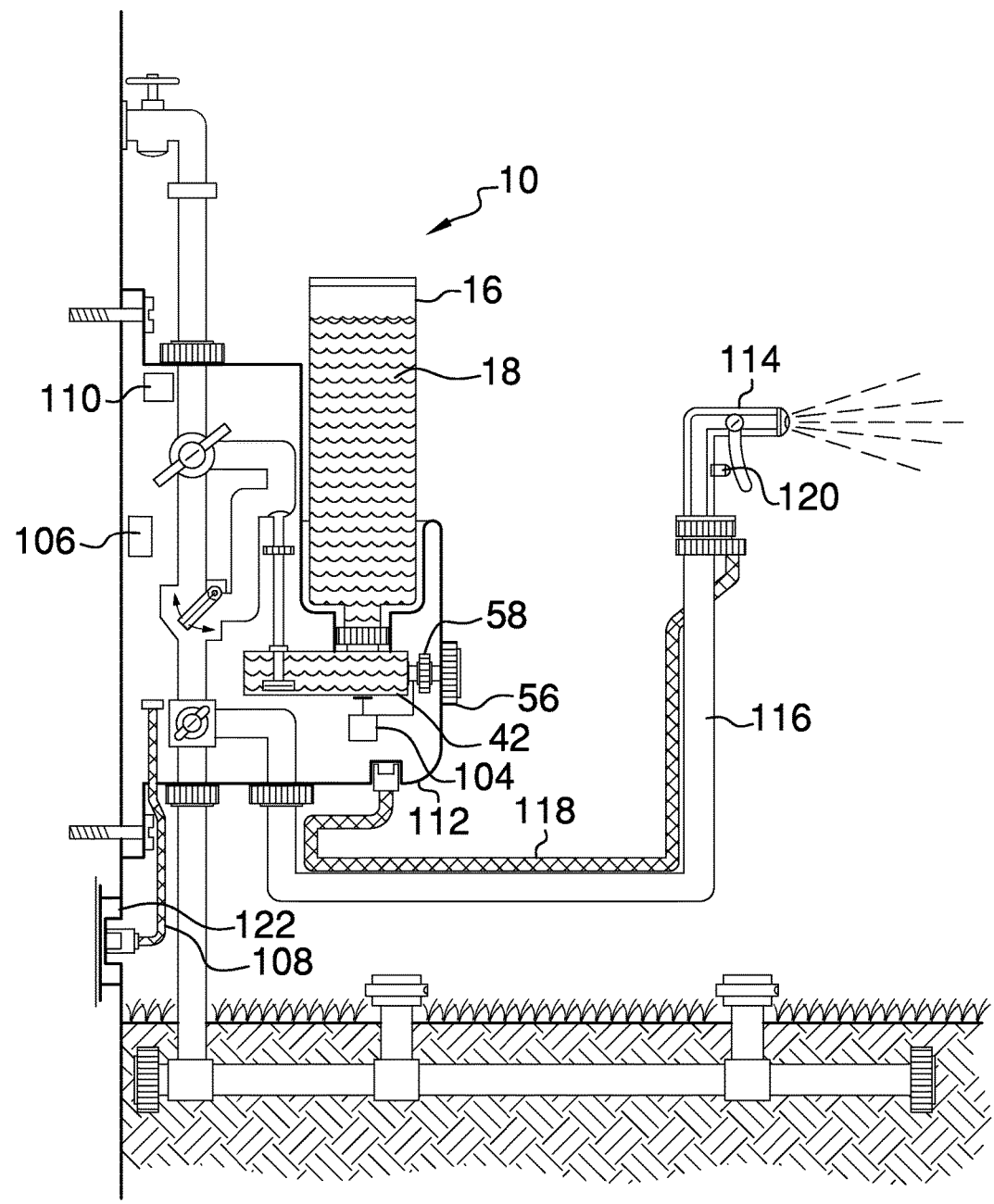
FIG. 12 is a diagrammatic view of an alternative embodiment of the dispenser of FIG. 1.

FIG. 12 diagrammatically illustrates an embodiment of the dispenser 10 further including an electrically powered pump 104, a controller 106, an electric power cord 108, an optional wireless receiver 110, an electrical communication port 112, a handheld spray nozzle 114, a fluid hose 116 and an electrical communication cable 118. Here, the electrically powered pump 104 is operated to pump a chemical concentrate solution from an auxiliary supply of chemical concentrate solution that is connected to auxiliary chemical concentrate solution coupling 56 and valve 58 and is positioned at an elevation below the fluid accumulator 42. The handheld spray nozzle 114 is fluidically connected to the dispenser 10 by fluid hose 116 connected to hose coupling 40. The handheld spray nozzle 114 may include one or more switches 120 configured to operate various components, such as the pump 104. An electrical communication cable 118 electrically connects the handheld spray nozzle 114 to the electrical communication port 112 such that operation of switch 120 is communicated to the dispenser 10 through cable 118 to effect the operation of pump 104, for example. The various valves may be electrically operable valves that such operation could be controlled by one or more switches on handheld spray nozzle 114. Electric power cord 108 is plugged into an electrical receptacle 122 providing the necessary electrical power to the various electrically operated components. Optionally, the handheld spray nozzle 114 could be wireless connected to the dispenser 10 for wireless communication of the operation of switch 120 and the like. Optionally, a wireless remote control (not shown) could also be provided to control various operational modes of the dispenser 10. Further, the controller 106 could be preprogrammed with various mode of operation, including but not limited to an automated flush mode.

Figure 13:
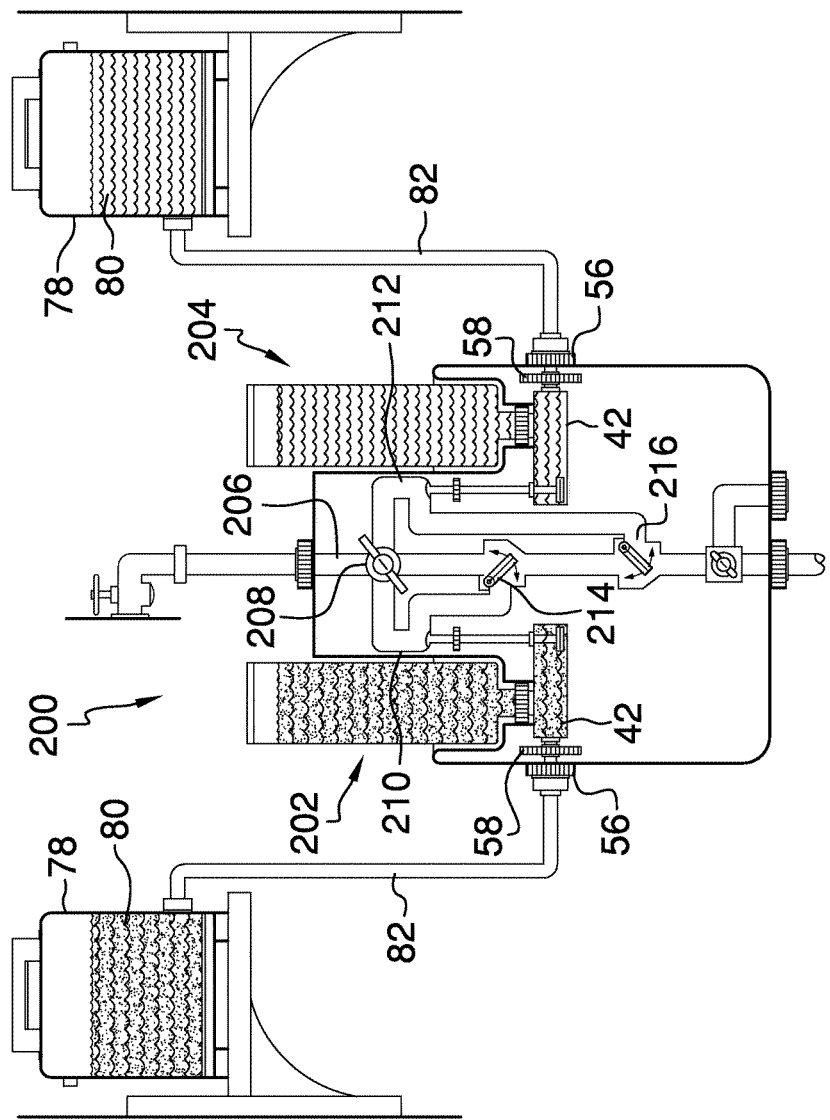
FIG. 13 is a diagrammatic view of an alternative embodiment of the dispenser of FIG. 1.

FIG. 13 diagrammatically illustrates an embodiment of a dispenser 200 having a dual chemical concentrate solution configuration comprising two of any number of the single chemical concentrate solution configuration embodiments as discussed above and illustrated in FIG. 1 through FIG. 12. Similar reference numbers refer to alike parts. As illustrated this embodiment includes two of the embodiment configurations illustrated in FIG. 7 and discussed above. Particularly a first dispenser configuration 202 and a second dispenser configuration 204. First dispenser configuration 202 and second dispenser configuration 204 may embody any one of the embodiments discussed above. In this embodiment, the main fluid passage 206 includes control valve 208 that is operable to selectively and fluidically connect the chemical mixing fluid passage 210 and 212 of the first and second dispenser configurations 202 and 204, respectively. Flapper valves 214 and 216 fluidically connect the downstream ends of passages 210 and 212, respectively. A discussion of the operation of this embodiment is not required, as the operation is readily apparent from the above description. Further illustrated are two auxiliary containers 78 containing a quantity of a secondary supply of chemical concentrate solution 80. Containers 78 are fluidically connected to the auxiliary chemical concentrate solution couplings 56 by conduit 82. Here, container 78 must be positioned at an elevation above the fluid accumulators 42 to permit the gravity feeding of the chemical concentrate solution 80 into the fluid accumulators. Valves 58 can be operated to selectively control the flow of the chemical concentrate solution 80 into the fluid accumulator 42.

Figure 14:
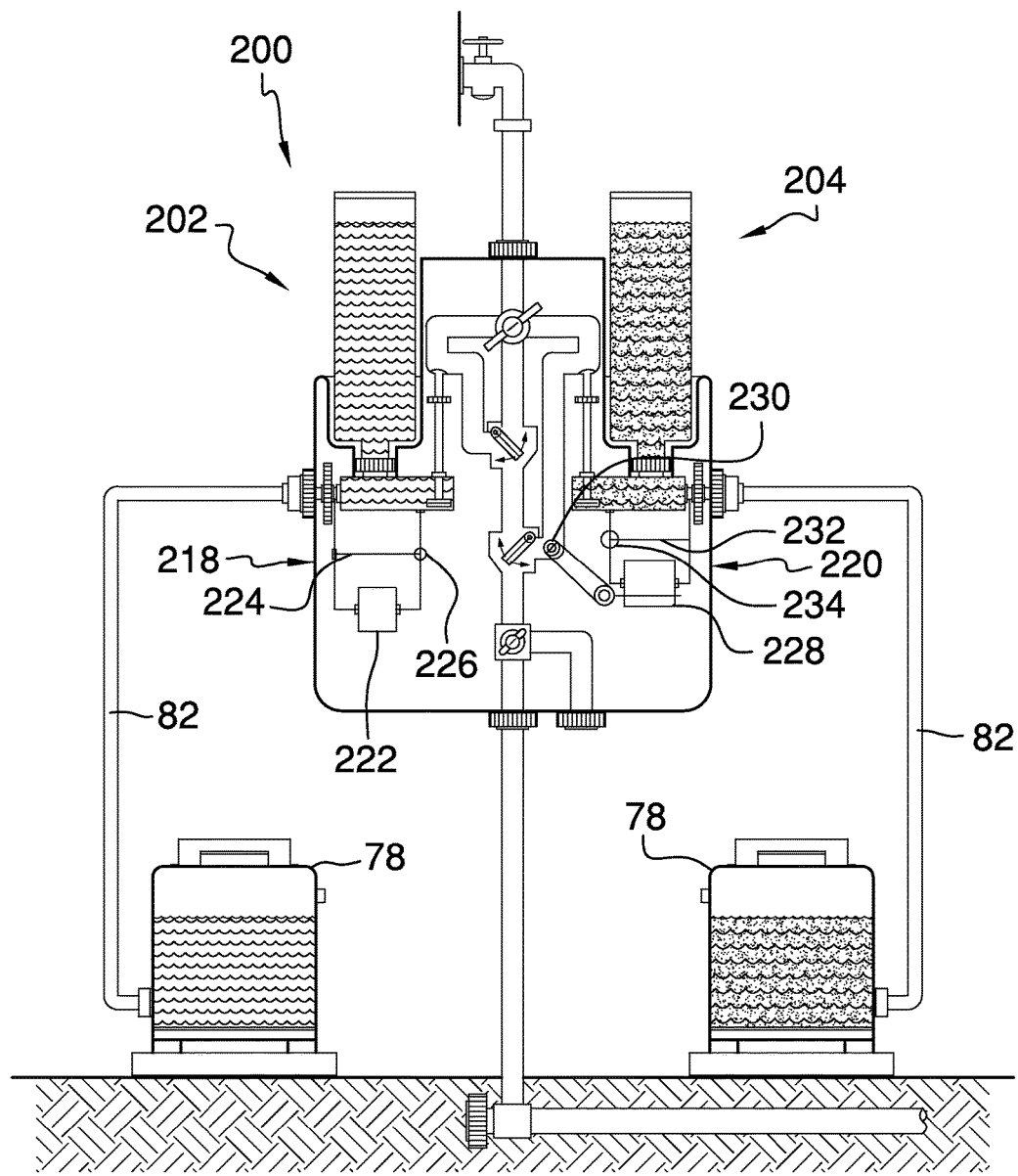
FIG. 14 is a diagrammatic view of an alternative embodiment of the dispenser of FIG. 13.

FIG. 14 diagrammatically illustrates an embodiment of the dispenser 200 including alternative pump configurations 218 and 220 for pumping a chemical concentrate solution similar to the embodiment shown in FIG. 12 and discussed above where the secondary supply of chemic concentrate solution is positioned at an elevation below the fluid accumulators. Either or of pump configuration 218 and 220 can be utilized in either of the dispensing configurations 202 and 204.

Pump configuration 218 includes an electrically powered pump 222 for use in areas where electrical power is available. While not specifically shown, dispenser 200 would include an electric power cable for connection to a source of electrical power, and would also include various switches and controls as described above to operate the dispenser and the electric pump 222. Pump configuration 218 may further include a bypass passage 224 and an unloader valve 226 to keep the pump primed such that it does not run dry and burn out from a lack of fluid or over loading. In operation, when fluid pressure within the accumulator is at a predetermined pressure, the unloader valve 226 will redirect the liquid to pass through the bypass passage 224 and back to the pump through the intake thereof.

Pump configuration 220 includes a pump 228 that is operatively connected to an impeller or turbine 230 positioned across passage 212 to drive the pump 228 as water/fluid flows through passage 212 and across the impeller or turbine 230. Pump configuration 220 is particularly useful where a source of electrical power is not available. Pump configuration 220 may further include a bypass passage 232 and an unloader valve 234 to keep the pump primed such that it does not run dry and burn out from a lack of fluid or over loading. In operation, when fluid pressure within the accumulator is at a predetermined pressure, the unloader valve 234 will redirect the liquid to pass through the bypass 232 passage and back to the pump through the intake thereof.

Figure 15:
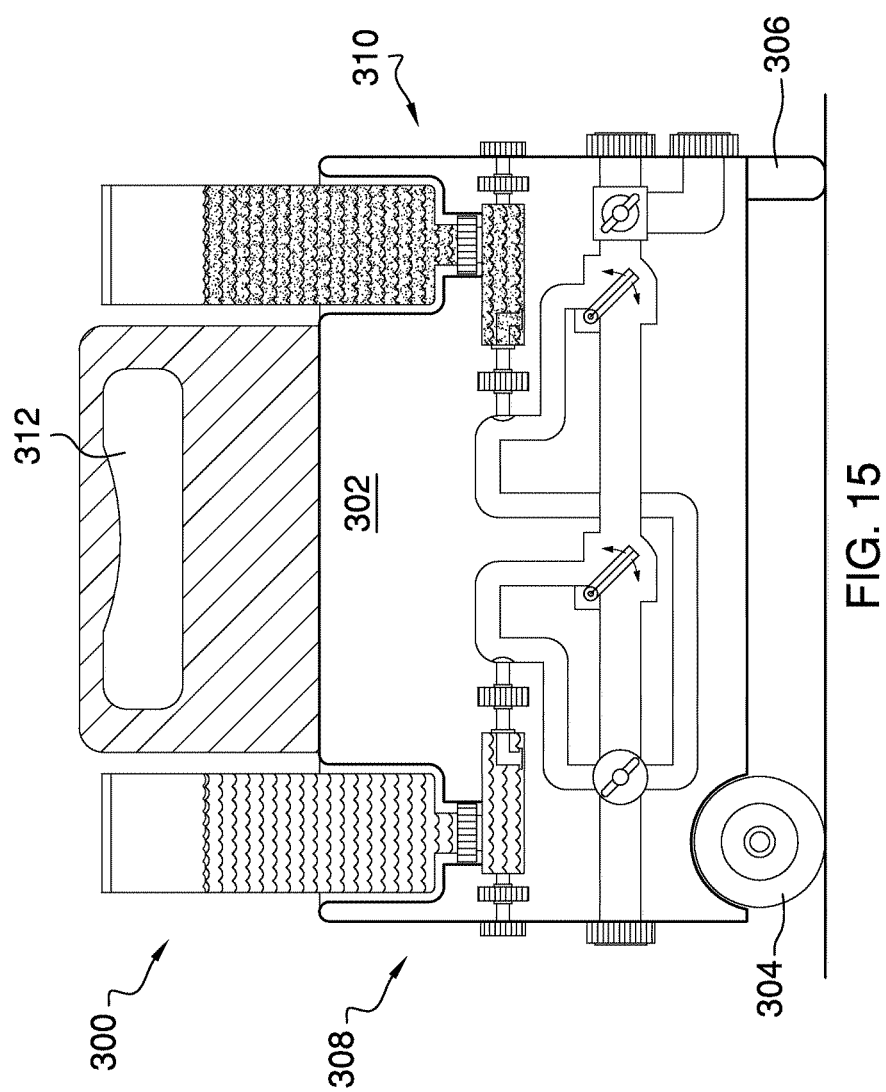
FIG. 15 is a diagrammatic view of an alternative embodiment of the dispenser of FIG. 12.

FIG. 15 diagrammatically illustrates an embodiment of a dispenser 300. Dispenser 300 is a mobile embodiment of any one of the number of dispenser embodiments discussed above and illustrated in FIG. 1 through FIG. 14. Similar reference numbers refer to alike parts. As illustrated here, dispenser 300 includes a wheeled cart 302 supported at one end by a pair of wheels 304 (only one wheel is visible) and at an opposite end by one or more stands 306. Dispenser 300 includes one or more of the dispenser embodiments discussed above, and particularly as illustrated here, includes a dual dispenser configuration comprising dispenser 308 and 310 similarly to the dispenser embodiment shown in FIG. 13 and discussed above. Accordingly, a description of the dispenser 308 and 310 is not required here. Wheeled cart 302 may further include a handle 312 for carrying the dispenser 300.

Figure 16:
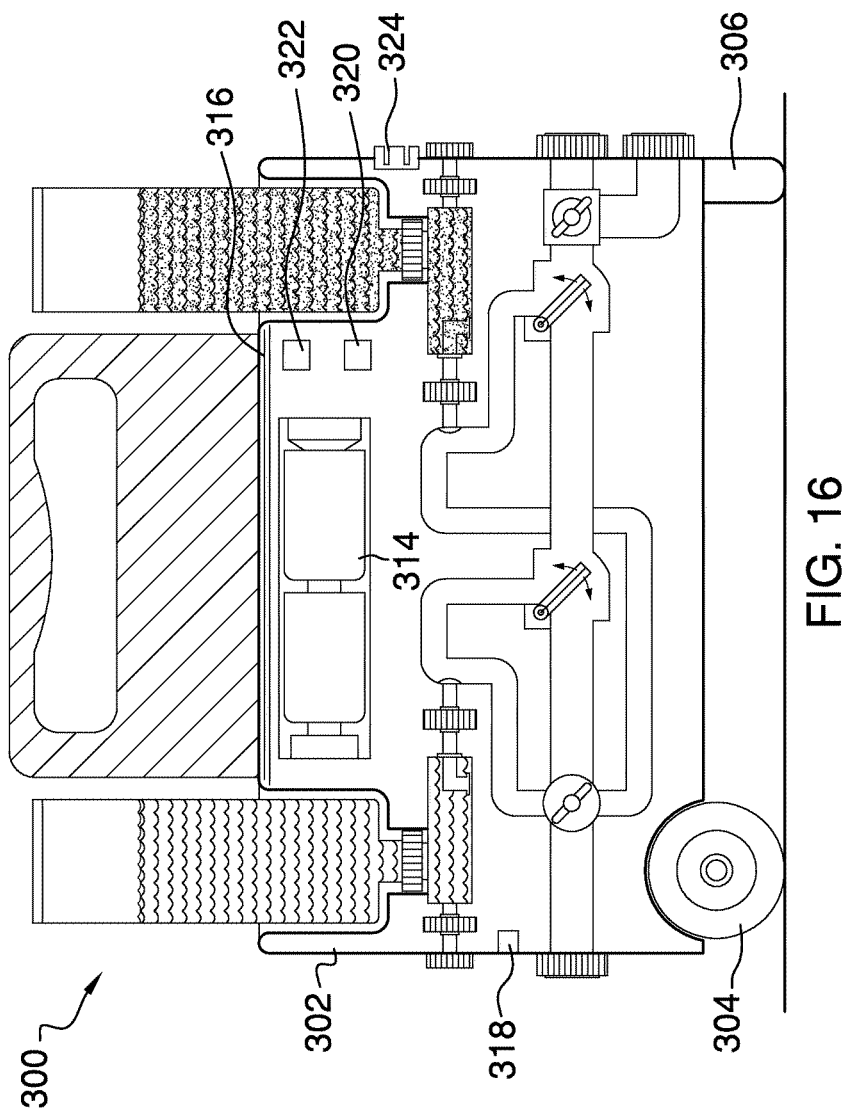
FIG. 16 is a diagrammatic view of an alternative embodiment of the dispenser of FIG. 15.

FIG. 16 diagrammatically illustrates an embodiment of a dispenser 300 further including a power supply such as batteries 314, an optional solar panel 316, an optional electrical power cord connection 318, a controller 320, an optional wireless receiver 322, and an electrical communication port 324. This embodiment is similar to the dispenser embodiment shown in FIG. 12 and discussed above. Solar panel 316 is provided to either recharge batteries 314 or separately power the various electrical components of the dispenser 300. Similarly, a power cord (not shown) can connect to the power cord connection 318 to recharge batteries 314 or separately power the various electrical components of the dispenser 300. The electrical communication port 324 is provided for connection to an electrical cable of a handheld sprayer, such as that of the handheld sprayer 114 of FIG. 12. The controller 320 could be preprogrammed with various mode of operation, including but not limited to an automated flush mode. Optionally, the handheld spray nozzle 114 could be wireless connected to the dispenser 300 for wireless communication of the operation of switch 120 and the like. Optionally, a wireless remote control (not shown) could also be provided to control various operational modes of the dispenser 300.

Figure 17:
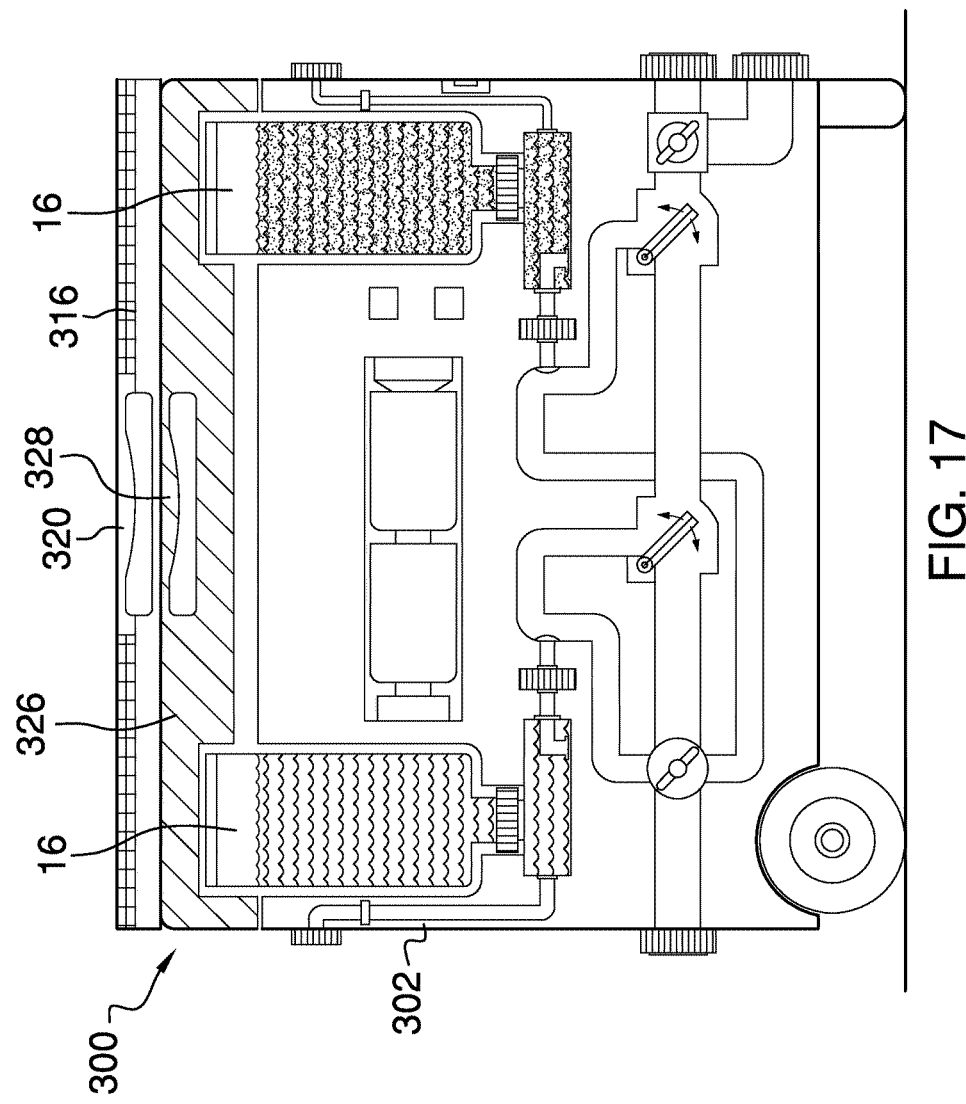
FIG. 17 is a diagrammatic view of an alternative embodiment of the dispenser of FIG. 16.

FIG. 17 diagrammatically illustrates an embodiment of a dispenser 300 further including a cover 326 attached to the wheeled cart 302 and enclosing the chemical solution containers 16. Cover 326 includes a handle 328. Solar panel 316 is removably attached to cover 326 and may also include a handle 330.

Figure 18:
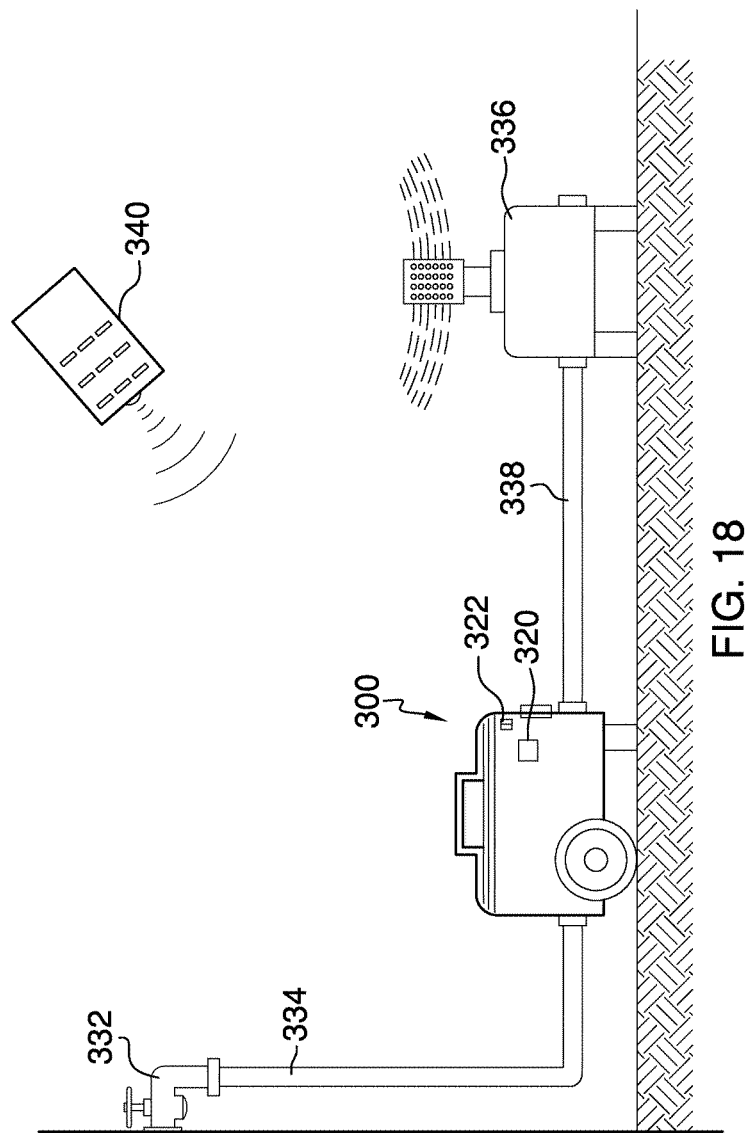
FIG. 18 is a diagrammatic view of the dispenser embodiments of FIG. 15 through FIG. 17 further including a remote control and an above ground sprinkler.

FIG. 18 diagrammatically illustrates the dispenser embodiment 300 of FIG. 15 through FIG. 17 with the dispenser 300 connected to a water faucet 332 by a hose 334 to provide a supply of fresh water to the dispenser in a manner described above. The dispenser 300 is further connected to an above ground sprinkler 336 by hose 338 in a manner described above. A wireless remote control 340 is further included to communicate with the controller 320 via the wireless receiver 322 to operate the various electrical components of the dispenser 300, such as electrically operable valves, etc.

Figure 19:
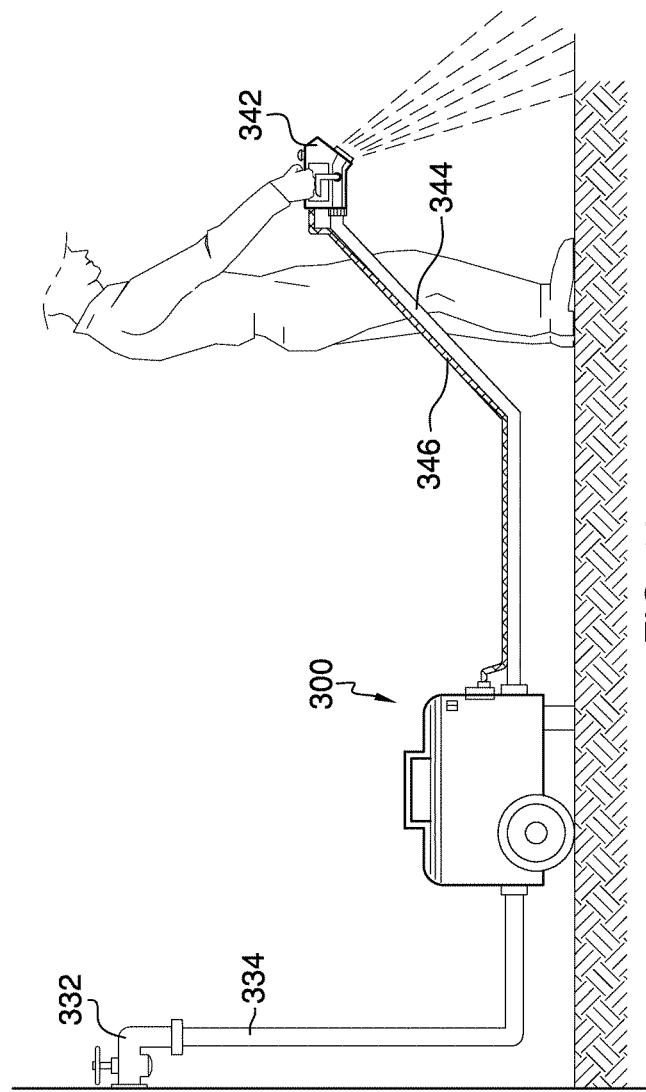
FIG. 19 is a diagrammatic view of the dispenser embodiments of FIG. 15 through FIG. 17 further including a handheld spray nozzle.

FIG. 19 diagrammatically illustrates the dispenser embodiment 300 of FIG. 15 through FIG. 17 with the dispenser 300 connected to a water faucet 332 by a hose 334 to provide a supply of fresh water to the dispenser in a manner described above. The dispenser 300 is further connected to a handheld spray nozzle 342 by water hose 344 and electrical communication cable 346 in a manner described above, particularly with respect to the dispenser embodiment of FIG. 12.

FIG. 20 diagrammatically illustrates the dispenser embodiment 300 of FIG. 15 through FIG. 17 disposed in a below ground installation method and connected to faucet 332 by hose 334 and connected to under ground sprinkler system 348 by conduit 350. Here, the wireless receiver 322 can be positioned above ground and electrically connected to the controller 320 by cable 352. While the dispenser embodiment of FIG. 15 through FIG. 17 is illustrated here, any one of the number of dispenser embodiments discussed above and shown in the figures of the drawings could be installed in an under ground application as similarly shown here.

A number of embodiments of the present invention have been described. Nevertheless, it will be understood that various modifications may be made without departing from the spirit and scope of the invention.

What is claimed is:

1. A chemical dispensing apparatus for use in delivery of a treatment solution to a lawn, the apparatus comprising:
    a housing;
    said housing defining a main fluid passage, said main fluid passage fitted with an inlet hose coupling at one end thereof and fitted with an outlet hose coupling at an opposite end thereof, said inlet hose coupling permitting connection of said main fluid passage to a source of pressurized water, said outlet hose coupling permitting connection of said main fluid passage to a fluid distribution system;
    said housing further defining a chemical mixing fluid passage connected at a first end to said main fluid passage and connected at a second end to said main fluid passage, whereby fluid flowing through said main fluid passage can be diverted to flow through said chemical mixing fluid passage and then returned to said main fluid passage;
    a first control valve fluidically connected to said main fluid passage and to said first end of said chemical mixing passage, said first control valve selectively positionable between a first position wherein fluid flowing through said main fluid passage is diverted to flow through said chemical mixing passage and a second position wherein fluid flowing through said main fluid passage is precluded from flowing through said chemical mixing passage;
    a flap valve fluidically connected to said main fluid passage and to said second end of said chemical mixing passage, said flap valve positionable between a first position where said main fluid passage is sealed by a flow of fluid through said chemical mixing passage and a second position where said chemical mixing passage is sealed by a flow of fluid through said main fluid passage disposed across said main fluid passage at a downstream location of said main fluid passage;
    a fluid accumulator for containing a liquid chemical; and
    a siphon tube connecting said fluid accumulator and said chemical mixing fluid passage such that a flow of fluid through said chemical mixing passage results in a quantity of liquid chemical contained in said fluid accumulator being drawn through said siphon tube and into the flow of fluid through chemical mixing fluid passage.

2. The apparatus of claim 1, further comprising:
    a chemical container fluidically connected to said fluid accumulator providing a quantity of liquid chemical to said fluid accumulator.

3. The apparatus of claim 2, further comprising:
    a cradle defined by said housing and configured to removably receive and retain said chemical container.

4. The apparatus of claim 2, wherein said chemical container is defined by said housing.

5. The apparatus of claim 1, further comprising:
    a second control valve disposed across said main fluid passaged at a downstream location from said flap valve;
    an auxiliary outlet passage connected at one end to said second control valve and fitted at an opposite end with an auxiliary hose coupling.

6. The apparatus of claim 5, further comprising:
    a chemical container fluidically connected to said fluid accumulator providing a quantity of liquid chemical to said fluid accumulator.

7. The apparatus of claim 6, further comprising:
    a cradle defined by said housing and configured to removably receive and retain said chemical container.

8. The apparatus of claim 6, wherein said chemical container is defined by said housing.

9. The apparatus of claim 1, further comprising:
    an auxiliary chemical concentrate fluid coupling configured to permit fluidic connection of said fluid accumulator with a secondary supply of chemical concentrate liquid.

* * * * *